US010450009B2

(12) United States Patent
Yamamoto et al.

(10) Patent No.: US 10,450,009 B2
(45) Date of Patent: Oct. 22, 2019

(54) PANEL LOCKING DEVICE FOR VEHICLE CARGO BED

(71) Applicant: KAWASAKI JUKOGYO KABUSHIKI KAISHA, Hyogo (JP)

(72) Inventors: Teruaki Yamamoto, Kakogawa (JP); Itsuo Takegami, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 252 days.

(21) Appl. No.: 14/914,889

(22) PCT Filed: Sep. 3, 2013

(86) PCT No.: PCT/JP2013/073647
§ 371 (c)(1),
(2) Date: Feb. 26, 2016

(87) PCT Pub. No.: WO2015/033385
PCT Pub. Date: Mar. 12, 2015

(65) Prior Publication Data
US 2016/0200374 A1 Jul. 14, 2016

(51) Int. Cl.
*E05C 19/14* (2006.01)
*E05B 65/00* (2006.01)
*B62D 33/037* (2006.01)

(52) U.S. Cl.
CPC .......... *B62D 33/037* (2013.01); *E05B 65/006* (2013.01); *E05C 19/14* (2013.01)

(58) Field of Classification Search
CPC ..... Y10S 292/49; Y10T 292/216; E05C 19/14
See application file for complete search history.

(56) References Cited

U.S. PATENT DOCUMENTS 2,472,285 A * 6/1949 Claud-Mantle ......... E05C 19/14
16/232
2,750,064 A * 6/1956 Clarke ................ A47J 41/0005
206/459.1

(Continued)

FOREIGN PATENT DOCUMENTS

| JP | 52-37366 | 8/1977 |
| JP | 3-52291 | 5/1991 |
| JP | 2006-70658 | 3/2006 |

OTHER PUBLICATIONS

Internation Search Report dated Nov. 5, 2013 in International (PCT) Application No. PCT/JP2013/073647.

*Primary Examiner* — Carlos Lugo
(74) *Attorney, Agent, or Firm* — Wenderoth, Lind & Ponack, L.L.P.

(57) ABSTRACT

A panel locking device for a vehicle cargo bed is configured to retain an openable gate-shaped panel so as to be upstanding at a closed position. The panel locking device includes a locking lever rotatably supported by a lever support portion provided at a first of the openable gate-shaped panel and a cargo bed panel adjacent to the openable gate-shaped panel, a movable hook rotatably coupled to a halfway portion of the locking lever, a first fixed hook provided to a second one of the openable gate-shaped panel and the cargo bed panel and configured to engage with the movable hook when the openable gate-shaped panel is located at the closed position, and a second fixed hook provided to the first one of the panels and configured to engage with the movable hook.

5 Claims, 7 Drawing Sheets

(56) References Cited

U.S. PATENT DOCUMENTS

| | | | | |
|---|---|---|---|---|
| 2,867,863 | A * | 1/1959 | Webb | E05C 19/14 |
| | | | | 292/247 |
| 3,146,011 | A * | 8/1964 | Seevers | E05C 19/14 |
| | | | | 292/247 |
| 3,917,328 | A * | 11/1975 | De Filippi | E05B 83/10 |
| | | | | 292/7 |
| 3,964,774 | A * | 6/1976 | Wollin | F16L 23/06 |
| | | | | 24/270 |
| 4,428,608 | A * | 1/1984 | Cooke | E05C 19/14 |
| | | | | 292/177 |
| 5,165,148 | A * | 11/1992 | Fleischer | B25B 5/12 |
| | | | | 24/494 |
| 5,462,318 | A * | 10/1995 | Cooke | E05C 19/14 |
| | | | | 292/113 |
| 6,041,721 | A * | 3/2000 | Weston | E05C 19/14 |
| | | | | 108/64 |
| 6,561,556 | B2 * | 5/2003 | Fuchs | B65D 45/345 |
| | | | | 292/113 |
| 7,156,429 | B2 * | 1/2007 | Eriksson | F16B 2/185 |
| | | | | 292/113 |
| 8,186,728 | B2 * | 5/2012 | Kopylov | E05C 19/14 |
| | | | | 292/113 |
| 8,864,208 | B2 * | 10/2014 | Kaku | B60P 1/26 |
| | | | | 292/281 |
| 9,731,775 | B1 * | 8/2017 | Tsumiyama | B60R 9/065 |

* cited by examiner

PANEL LOCKING DEVICE FOR VEHICLE CARGO BED

TECHNICAL FIELD

The present invention relates to a panel locking device for a vehicle cargo bed.

BACKGROUND ART

A vehicle cargo bed typically includes a bottom plate, left and right side panels, a tail panel, and a front panel. The tail panel and/or the side panels are each formed in an openable gate shape for loading and unloading cargo.

Such a gate-shaped panel is positionally changeable between a closed position where the panel is rotatably supported by an end of the bottom plate via a hinge and upstands substantially vertically from the bottom plate and a fully opened position where the panel hangs down from the bottom plate. There is provided a panel locking device configured to retain the gate-shaped panel at the closed position.

FIG. 10 depicts a conventional panel locking device for a cargo bed according to Japanese Utility Model Publication No. JP H3-52291, which includes a locking handle (locking lever) 91 rotatably provided to an openable gate-shaped panel 90, and a U-shaped handle ring (movable hook) 92 coupled to the locking handle 91. The panel locking device further includes a fixed hook 94 provided to an adjacent panel 93. The handle ring 92 is engaged with the fixed hook 94 and the locking handle 91 is rotated about a spindle 95 to pull the handle ring 92, so that the gate-shaped panel 90 is fixed at the closed position.

Problems to be Solved by the Invention

In a vehicle provided with the gate-shaped panel described above, the gate-shaped panel is occasionally opened into a substantially horizontal state to be used as an extending portion from the bottom plate while loading cargo that is long or has a large area enough to project from the cargo bed. The gate-shaped panel in the horizontal state is coupled to the adjacent panel by wire, chain, or the like so as to be retained horizontally.

However, when the gate-shaped panel is opened in the substantially horizontal state, the locking handle 91 and the handle ring 92 are swingable about the spindle 95. The locking handle 91 and the handle ring 92 may swing during travel to come into contact with the tail panel 90 or the like and make noise.

SUMMARY OF THE INVENTION

It is an object of the present invention to provide a panel locking device for a vehicle cargo bed, configured to retain a locking lever such as a locking handle in a locking state even while an openable gate-shaped panel is opened, so as to prevent the locking lever or the like from swinging.

Solutions to the Problems

In order to achieve the object mentioned above, the invention of the present application provides a panel locking device for a vehicle cargo bed, configured to retain an openable gate-shaped panel upstanding at a closed position, the panel locking device including: a locking lever supported to be rotatable about a spindle by a lever support portion provided at a first one of the gate-shaped panel and a cargo bed panel adjacent to the gate-shaped panel; a movable hook rotatably coupled to a halfway portion of the locking lever; a first fixed hook provided to a second one of the gate-shaped panel and the cargo bed panel and configured to engage with the movable hook when the gate-shaped panel is located at the closed position; and at least one second fixed hook provided to the first one of the panels and configured to engage with the movable hook.

The panel locking device according to the invention preferably includes any of the following configurations.

(a) The second fixed hook is provided integrally with the lever support portion.

(b) The at least one second fixed hook includes a pair of second fixed hooks spaced apart from each other along a rotational axis core of the locking lever, and the first fixed hook is provided to be located between the pair of second fixed hooks when the gate-shaped panel is located at the closed position.

(c) The lever support portion is provided to the gate-shaped panel.

(d) In the panel locking device including the above configuration (c), it is further preferred that the gate-shaped panel is a tail panel disposed at a rear end of the cargo bed, and the adjacent panel is a side panel disposed at each of left and right ends of the tail panel.

EFFECTS OF THE INVENTION

The invention of the present application causes (1) the locking lever to be fixed by the second fixed hook while the vehicle travels with the gate-shaped panel opened, to prevent the locking lever from swinging during travel as well as from coming into contact with the panel or the like to make noise.

(2) The configuration (a) saves the number of components and facilitates production, as well as allows the distance between a rotation fulcrum of the locking lever and the second fixed hook to be easily set to a desired value so as to allow the locking lever to be fixed stably.

(3) The configuration (b) allows the first fixed hook to be accommodated between the second fixed hooks when the gate-shaped panel is closed and locked, to achieve reduction in size of the panel locking device and its periphery.

(4) In a case where a gate-shaped panel used in the opened state is provided with a locking lever, the locking lever hangs down from a lever support portion and is likely to swing during travel in a conventional configuration. In contrast, the configuration (c) according to the present invention effectively prevents the locking lever from swinging.

(5) Among the plurality of panels surrounding the cargo bed, the tail panel disposed at the rear end of the cargo bed is often used in the opened state. The locking lever provided to the tail panel is configured to lock the tail panel in the opened state, so that the second fixed hook is used effectively.

EMBODIMENTS OF THE INVENTION

An embodiment of the present invention will now be described with reference to FIGS. 1 to 8. A vehicle according to the present embodiment is a utility vehicle. For easier description, assume that the vehicle travels "forward" with respect to the vehicle and respective components, and left and right sides of a crew correspond to "left and right sides" of the vehicle and the respective components.

Figure 1:
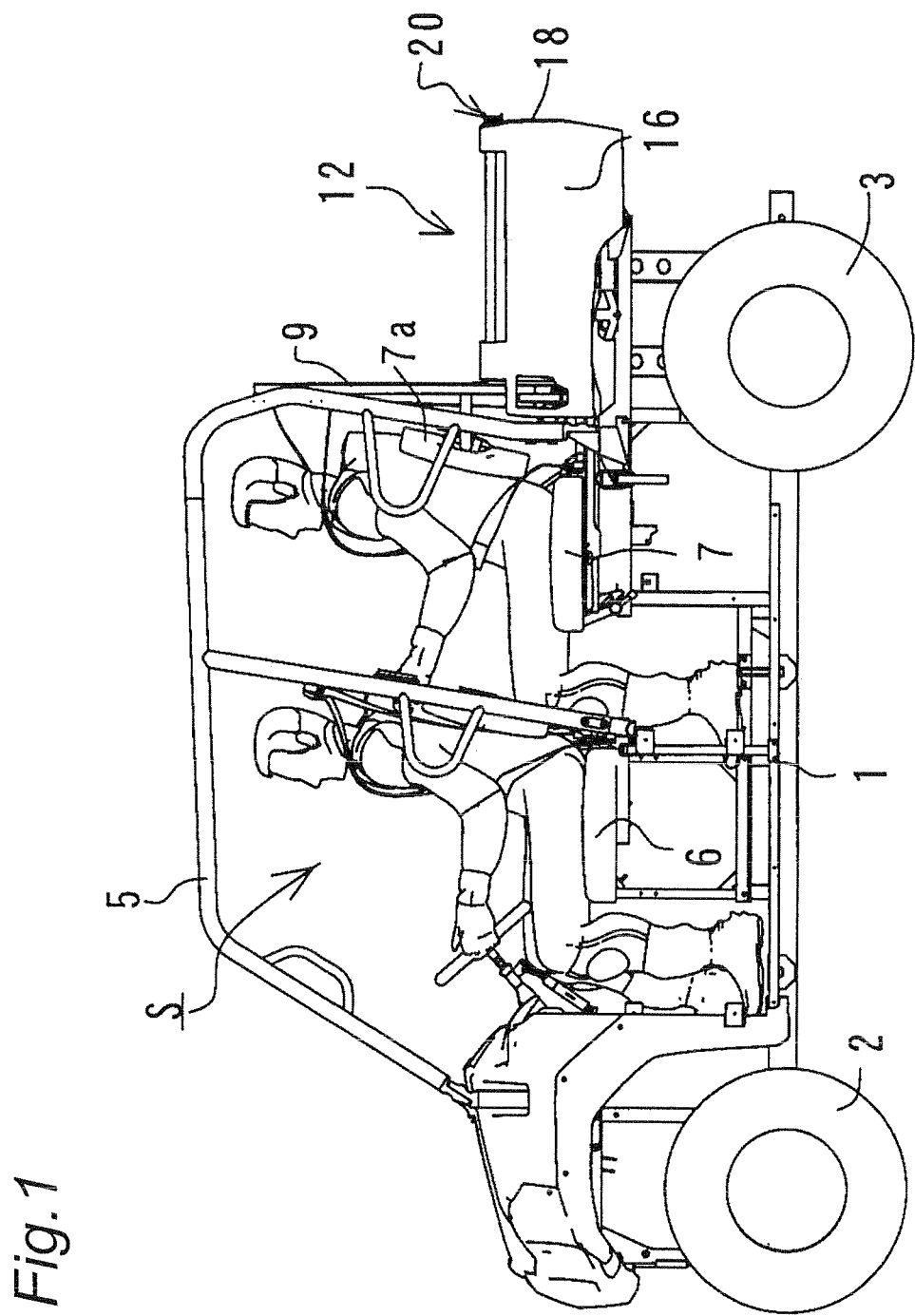
FIG. 1 is a left side view of a utility vehicle including a panel locking device for a cargo bed according to the invention of the present application.

FIG. 1 is a left side view of the utility vehicle that includes a chassis 1 that has a front portion provided with a pair of left and right front wheels 2 and a rear portion provided with a pair of left and right rear wheels 3. A riding space (cabin) S is provided between the front wheels 2 and the rear wheels 3 and is surrounded with a R.O.P.S. 5. The R.O.P.S. 5 is an abbreviation for a rollover protective structure. The riding space S includes a front half provided with a front seat 6 for two or three passengers and a rear half provided with a rear seat 7 for two or three passengers. The rear seat 7 is provided therebehind with a cargo bed 12. There is provided, between the rear seat 7 and the cargo bed 12, with a screen 9 that is shiftable in the anteroposterior direction. For example, the rear seat 7 and a backrest 7a thereof are configured to be folded and accommodated in a lower front area whereas the cargo bed 12 is configured to extend into the rear half of the riding space S in the state where the rear seat 7 and the backrest 7a are folded. The present invention is obviously applicable to a utility vehicle including the rear seat 7 not configured to be foldable.

Figure 2:
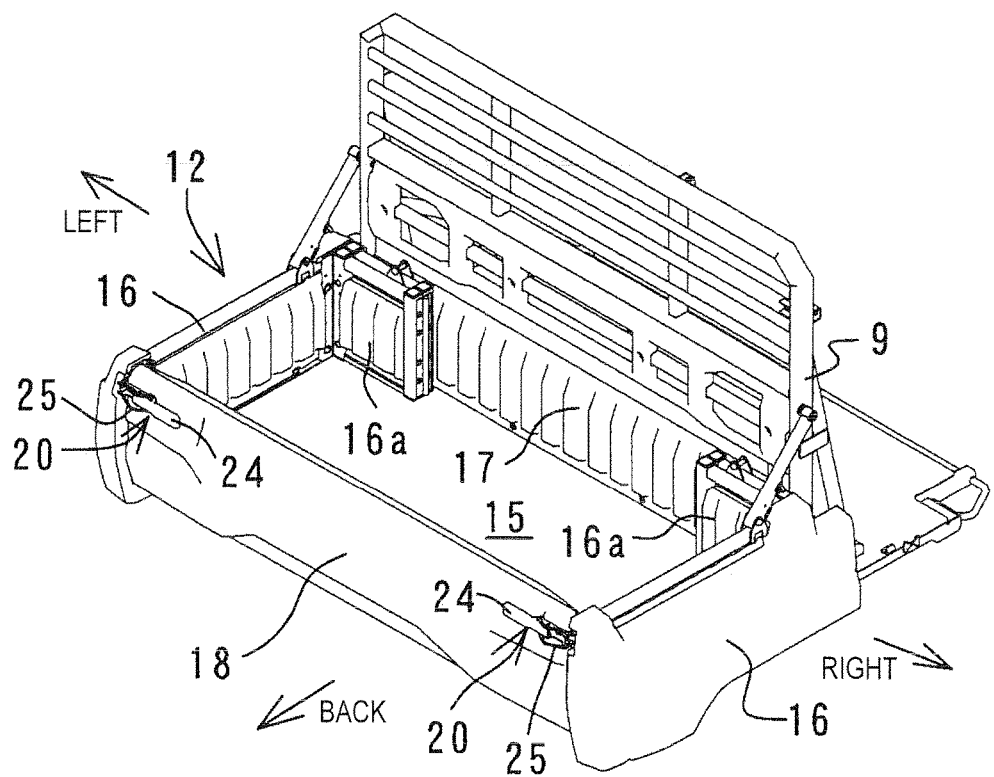
FIG. 2 is a perspective view from behind and from above a rear right end of the cargo bed of a vehicle depicted in FIG. 1.

FIG. 2 is a perspective view of the cargo bed 12 that includes a bottom plate 15, a pair of left and right side panels 16, a front panel 17, and a tail panel 18, The front panel 17 is provided integrally with the screen 9 so as to be shiftable along with the screen 9 in the anteroposterior direction. The side panels 16 are each provided at the front end with a foldable extending portion 16a. When the extending portions 16a are linearly extended in the anteroposterior direction and the screen 9 and the front panel 17 are shifted forward, the cargo bed 12 is extended forward.

The tail panel 18 is an openable gate-shaped panel and is provided as a separate member from the front panel 17, the side panels 16, and the bottom plate 15. The lower end of the tail panel 18 is coupled to the rear end of the bottom plate 15 via a hinge (not depicted), so that the tail panel 18 is rotatably shifted between a closed position where the panel upstands substantially vertically (the position depicted in FIG. 2) and a fully opened position where the panel hangs down from the rear end of the bottom plate 15. The tail panel 18 is made of a plate metal material, a reinforced resin material, or the like.

A panel locking device 20 configured to lock the tail panel 18 at the closed position is provided at each of the upper left end and the upper right end of the tail panel 18. The left and right panel locking devices 20 are basically the same and are just configured symmetrically in the horizontal direction. Accordingly, the right panel locking device 20 will be described below in detail and the left panel locking device 20 will not be described repeatedly.

Figure 3:
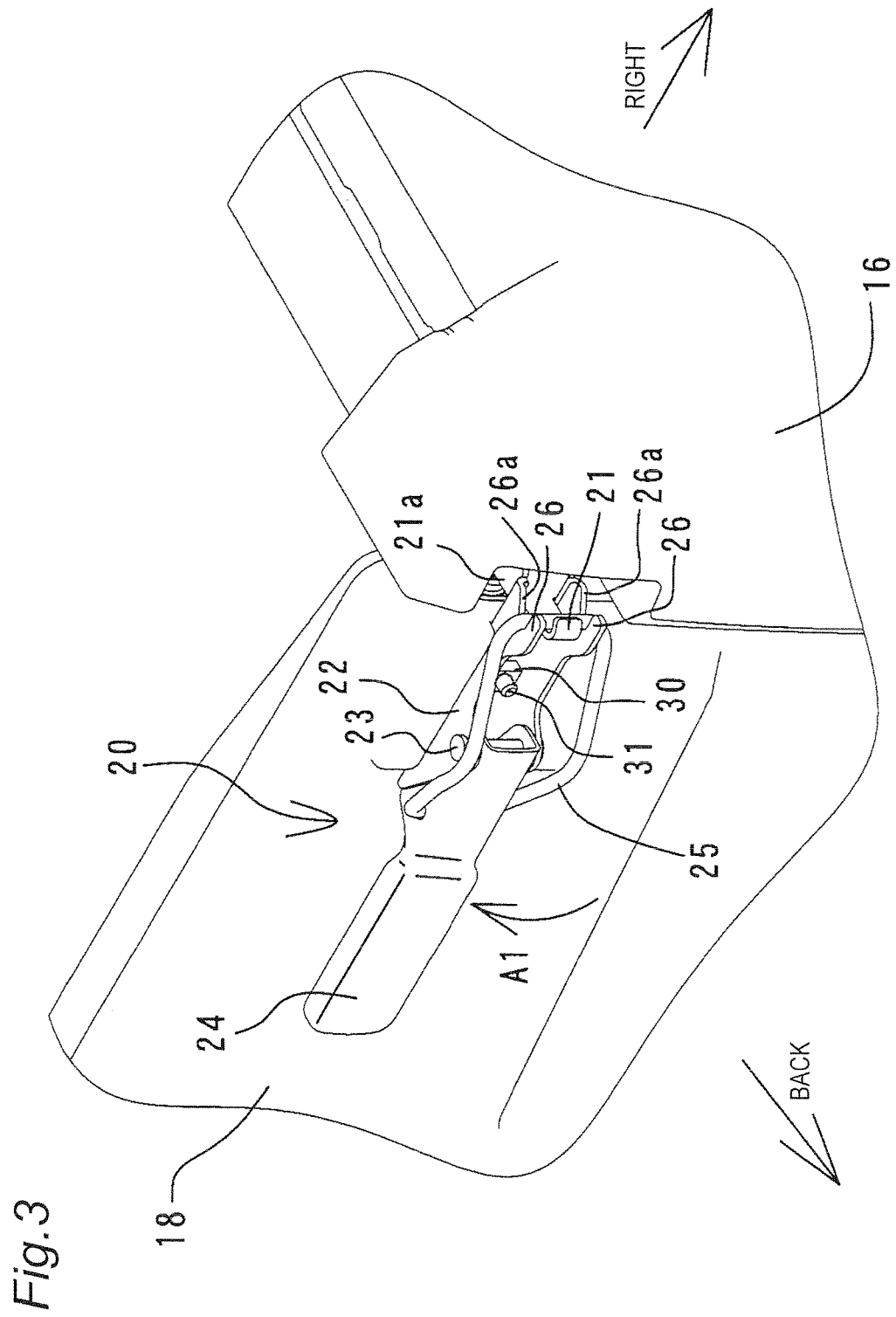
FIG. 3 is an enlarged perspective view of the panel locking device for the cargo bed depicted in FIG. 2.

FIG. 3 is an enlarged perspective view of the right panel locking device 20 that includes a first fixed hook 21 firmly fixed to the upper rear end of the corresponding side panel 16, a lever support portion 22 firmly fixed to the upper right end of the rear surface of the tail panel 18, a locking lever 24 rotatably provided to the lever support portion 22 via a substantially vertical spindle 23, a movable hook 25 made of spring steel and rotatably coupled to a longitudinal halfway portion of the locking lever 24, and a pair of second fixed hooks 26 formed integrally with the distal end (right end) of the lever support portion 22.

Figure 6:
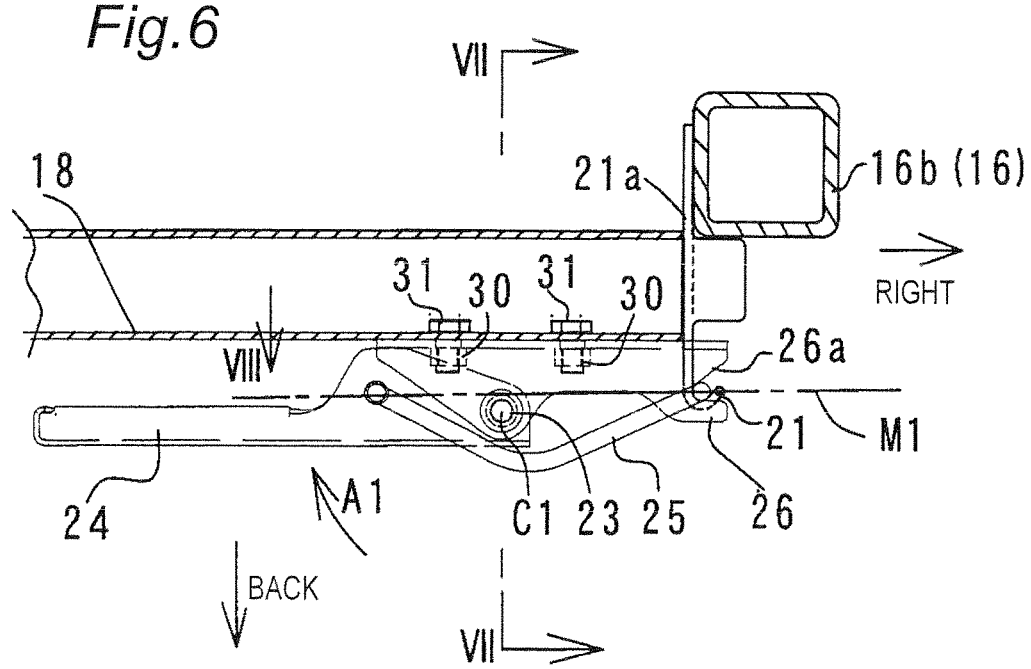
FIG. 6 is an enlarged plan view of the panel locking device depicted in FIG. 2.
Figure 7:
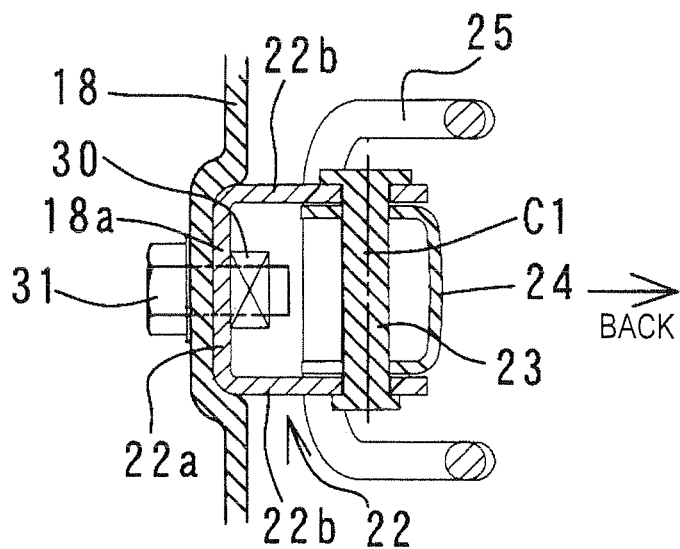
FIG. 7 is a sectional view taken along line VII-VII indicated in FIG. 6.
Figure 8:
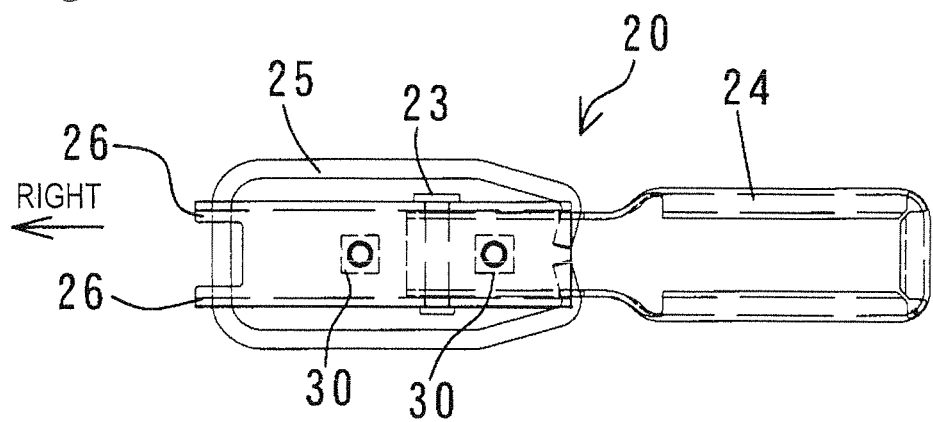
FIG. 8 is a front view (view along arrows VIII) of the panel locking device depicted in FIG. 6.

FIG. 7 depicts a section of the right panel locking device 20 taken along line VII-VII indicated in FIG. 6. The lever support portion 22 has a U-shaped section (substantially cornered U-shaped section) which is formed by a front wall 22a and upper and lower walls 22b so as to have an opened rear end. The spindle 23 is directed substantially vertically and is firmly fixed to the upper and lower walls 22b. The front wall 22a of the lever support portion 22 has a rear surface to which a plurality of nuts 30 is welded. The front wall 22a of the lever support portion 22 is pressed against a recess 18a in the rear surface of the tail panel 18 and a bolt 31 inserted from forward through a bolt hole in the tail panel 18 is screwed to each of the nuts 30, so that the lever support portion 22 is firmly fixed to the rear surface of the tail panel 18.

The locking lever 24 has a U-shaped (substantially cornered U-shaped) section with an opened front end, and is fitted between the upper and lower walls 22b of the lever support portion at the spindle 23 and its periphery.

The locking lever 24 depicted in FIG. 6 extends from the spindle 23 toward the center in the vehicle width direction (leftward). The movable hook 25 extends outward in the vehicle width direction (rightward) from an intermediate portion of the locking lever 24 in the left-right width direction, so as to have a chevron shape projecting backward when viewed from above. The movable hook 25 is made of spring steel and has the chevron shape, so as to be elastically expandable and contractable in the left-right direction.

The second fixed hooks 26 are each provided at a position distant rightward by a predetermined distance from an axial center C1 of the spindle 23 and are formed integrally with the lever support portion 22. The second fixed hooks 26 are respectively provided at wall portions continuous to the upper and lower walls 22b of the lever support portion 22. In other words, the pair of second fixed hooks 26 is spaced apart from each other in the up-down direction. The second fixed hooks 26 each have an inner recess in a U shape opened rightward. The inner recess has a front edge 26a that is directed rightward and is slanted forward. In other words, the inner recess has an anteroposterior width gradually expanding forward toward the right.

The first fixed hook 21 is bent to the right into a J shape and is provided integrally with a base plate portion 21a extending forward. The base plate portion 21a is welded to a side surface of core metal 16b configuring a rear end of a frame of the side panel 16.

The first fixed hook 21 in a natural state is located at a position in the vehicle width direction, which is slightly displaced rightward (outward in the vehicle width direction) from the positions of the inner recesses of the second fixed hooks 26 on the tail panel 18. In order to engage the distal end of the movable hook 25 with the first fixed hook 21 and the second fixed hooks 26, the distal end of the movable hook 25 initially comes into contact with the first fixed hook 21 and is subsequently engaged with the second fixed hooks 26 with the first fixed hook 21 being slightly warped leftward. In other words, the distal end of the movable hook 25 is configured to be engaged with the second fixed hooks 26 with the first fixed hook 21 securely pressed leftward.

Described next are opening/closing the tail panel 18 and locking operation of the panel locking device 20. When the tail panel 18 is rotated to the closed position in the state depicted in FIG. 3, the first fixed hook 21 on the side panel 16 is fitted between the upper and lower second fixed hooks 26 on the tail panel 18. In this state, the locking lever 24 is rotated about the spindle 23 against an arrow A1 to engage the distal end of the movable hook 25 with the first fixed hook 21 and the second fixed hooks 26, and the locking lever 24 is subsequently rotated about the spindle 23 along the arrow A1. The distal end of the movable hook 25 initially comes into contact with the first fixed hook 21 and is engaged with the second fixed hooks 26 with the first fixed hook 21 being slightly warped leftward.

When the locking lever is further rotated along the arrow A1 in the state depicted in FIG. 6, a line Ml connecting the left and right ends of the movable hook 25 shifts forward beyond the axial center C1 of the spindle 23. Pulling force of the movable hook 25 made of spring steel is thus converted to forward rotating force of the locking lever 24. Accordingly, the locking lever 24 is biased forward whereas the movable hook 25 is pulled in the left-right direction as well as is biased forward, so that the tail panel 18 is locked at the closed position.

In order to unlock the tail panel 18, the locking lever 24 in the state depicted in FIG. 6 is rotated against the arrow A1 so as to disengage the locking lever 24 from the first fixed hook 21 and the second fixed hooks 26.

Figure 4:
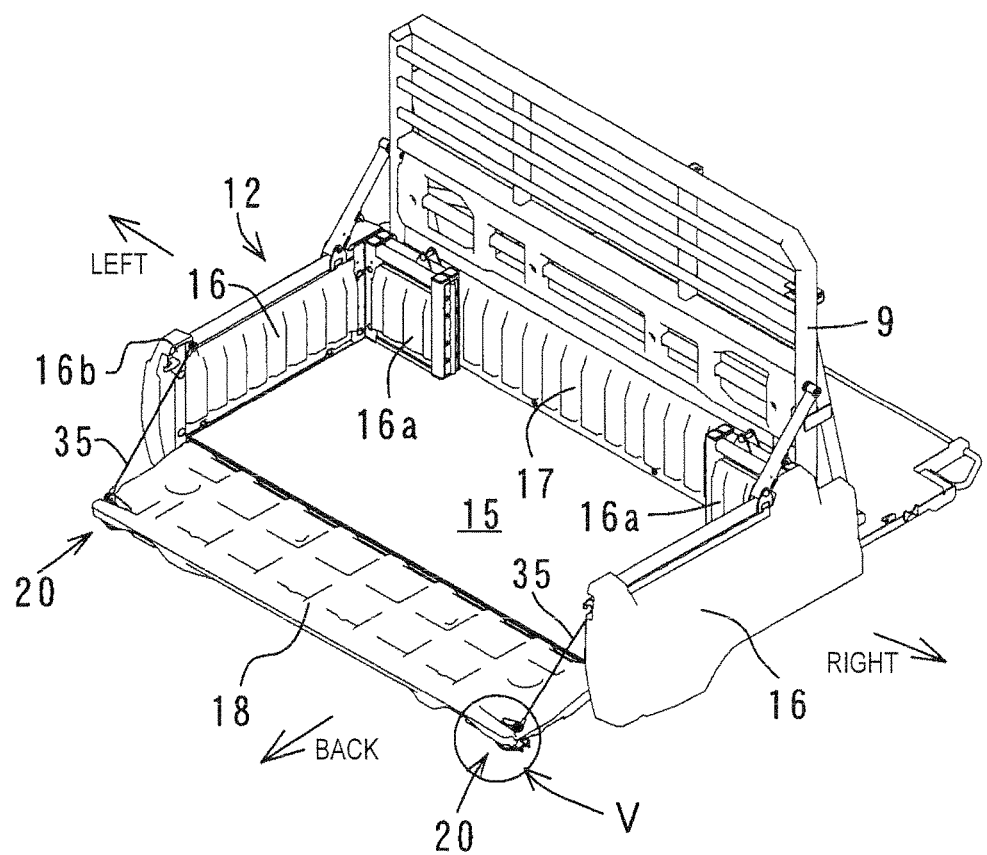
FIG. 4 is a perspective view of a cargo bed similar to that depicted in FIG. 2, in which a tail panel is substantially horizontally opened and retained.
Figure 5:
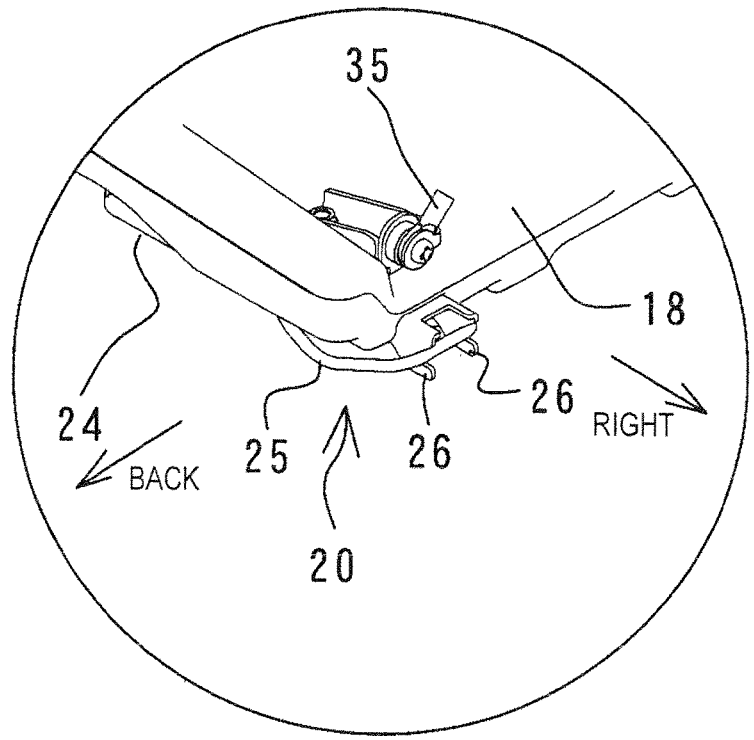
FIG. 5 is an enlarged view of a portion (surrounded with a circle) indicated by an arrow V in FIG. 4.

When the tail panel 18 is opened into the substantially horizontal state as depicted in FIG. 4 to be used as the extending portion of the bottom plate 15, wire 35 is provided between the upper end of the core metal 16b of each of the left and right side panels 16 and a corresponding one of the rear left end and the rear right end of the tail panel 18, to keep the tail panel 18 in the substantially horizontal state. As depicted in FIG. 5, the distal end of the movable hook 25 is engaged with only the second fixed hooks 26 in this case, so as to keep the locking lever 24 and the movable hook 25 in a locking state. In other words, the locking lever 24 and the movable hook 25 are retained in a fixed state. Accordingly, the locking lever 24 and the movable hook 25 will neither swing nor come into contact with the tail panel 18 during travel.

(Effects of the Embodiment)

(1) When the vehicle travels with the openable gate-shaped tail panel 18 being opened in the substantially horizontal state as depicted in FIG. 4, the movable hook 25 of the panel locking device 20 is engaged with the second fixed hooks 26 on the tail panel 18 as depicted in FIG. 5. It is thus possible to prevent the locking lever 24 and the movable hook 25 from swinging as well as from coming into contact with the tail panel 18 to make noise.

(2) The second fixed hooks 26 disposed on the tail panel 18 are formed integrally with the lever support portion 22. This saves the number of components of the panel locking device 20 as well as facilitates production thereof. Furthermore, the distance between the axial center C1 of the spindle 23 of the locking lever 24 and each of the second fixed hooks 26 can be easily set to a desired value so as to stably keep the locking lever 24 in the locking state.

(3) As depicted in FIG. 3, the pair of second fixed hooks 26 is spaced apart from each other in the up-down direction on the tail panel 18 and the first fixed hook 21 on the side panel 16 is provided to be located between the upper and lower second fixed hooks 26 when the tail panel 18 is located at the closed position. When the tail panel 18 is closed and locked, the first fixed hook 21 is accommodated between the second fixed hooks 26 to achieve reduction in size of the panel locking device 20 and its periphery.

(4) The front edge 26a of the inner recess of each of the second fixed hooks 26 is slanted, so that the inner recess is gradually expanded in anteroposterior width toward the open end of the recess. Accordingly, the movable hook 25 can be easily hung to the second fixed hooks 26 for locking, and the distal end of the movable hook 25 can be reliably guided to the deep end of the inner recess by the slanted front edge 26a.

(5) Among the plurality of panels surrounding the cargo bed, the tail panel 18 disposed at the rear end of the cargo bed is often used in the opened state. The locking lever 24 provided to the tail panel 18 is configured to lock the tail panel 18 even in the opened state, so that the second fixed hooks 26 are used effectively.

(Other Embodiments)

Figure 9:
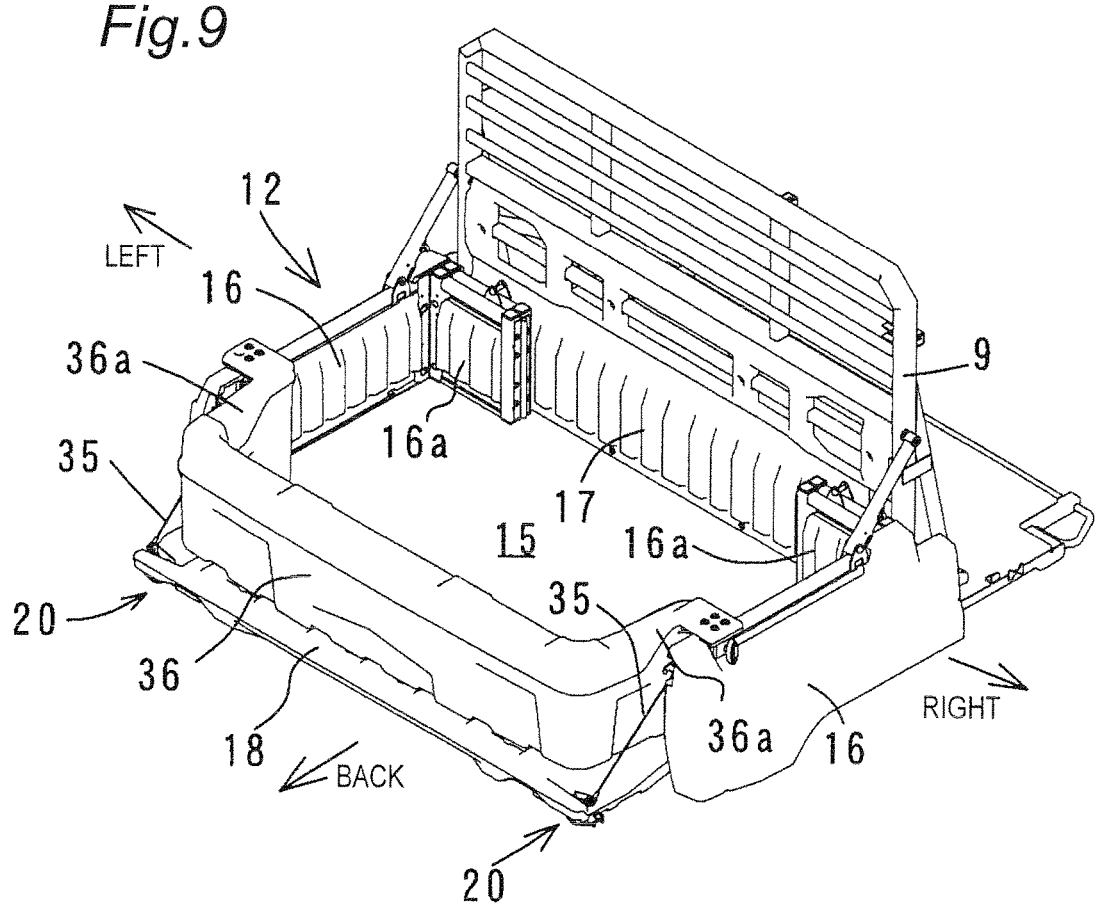
FIG. 9 is a perspective view of a cargo bed similar to that depicted in FIG. 2, to which a tail panel unit to be retrofitted is attached.
Figure 10:
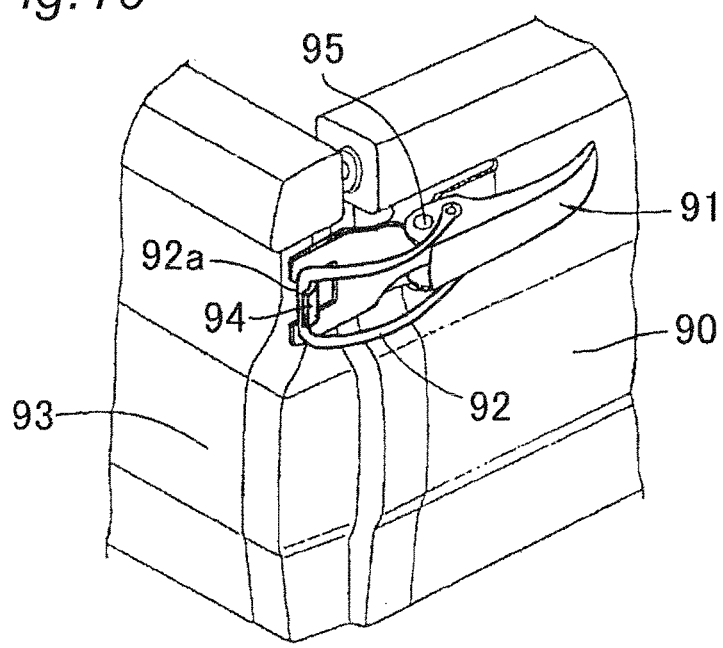
FIG. 10 is a perspective view of a conventional panel locking device for a cargo bed.

(1) FIG. 9 exemplifies a case where a retrofitted tail panel unit 36 is equipped on the upper surface of the tail panel 18 that is used in the horizontal state as the backward extending portion of the bottom plate 15. The tail panel unit 36 is integrally provided, at the left and right ends, with side panel portions 36a, of which front ends are fixed to the left and right side panels 16 and the bottom plate 15 by bolts or the like. The retrofitted tail panel unit 36 is equipped to prevent cargo in the cargo bed 12 from largely shifting backward.

(2) According to the embodiment described above, the pair second fixed hooks is provided to be spaced apart from each other in the up-down direction whereas the first fixed hook is provided to be accommodated between the upper and lower second fixed hooks. The present invention can also adopt a configuration in contrast to this configuration, in which a pair of first fixed hooks is provided to be spaced apart from each other in the up-down direction whereas the second fixed hook is provided to be accommodated between the first fixed hooks. The present invention can obviously adopt a configuration provided with a single first fixed hook and a single second fixed hook.

(3) According to the above embodiment, the openable gate-shaped tail panel is provided with the locking lever and the second fixed hooks whereas the side panel is provided with the first fixed hook. The present invention can also adopt a structure in which the side panel is provided with the locking lever and the second fixed hooks whereas the openable gate-shaped tail panel is provided with the first fixed hook configured to retain the tail panel at the closed position.

(4) According to the above embodiment, the panel locking device is configured to lock the openable gate-shaped tail panel at the closed position. The present invention is also applicable to a panel locking device configured to retain an openable gate-shaped side panel at a closed position. In this case, the panel locking device can be disposed between each of the left and right ends of the front panel and the front end of each of the side panels.

(5) According to the above embodiment, the locking lever and the movable hook are disposed to extend substantially horizontally. The present invention is also applicable to a panel locking device in which a locking lever is rotatably supported by a substantially horizontal spindle and the locking lever and a movable hook are disposed to extend in the up-down direction.

(6) The present invention is not limited to the panel locking device for the cargo bed of the utility vehicle but is applicable to a panel locking device for a cargo bed of an ordinary truck.

(7) The present invention is not limited to the configurations according to the embodiment described above, but can include various modification examples devisable within the scope not departing from the features recited in the following patent claims.

DESCRIPTION OF REFERENCE SIGNS

16: Side panel (exemplary cargo bed panel)
17: Front panel
18: Tail panel (exemplary gate-shaped panel)
20: Panel locking device
21: First fixed hook
22: Lever support portion
23: Spindle
24: Locking lever
25: Movable hook
26: Second fixed hook

The invention claimed is:

1. A panel locking device for a vehicle cargo bed, configured to retain an openable gate shaped panel so as to be upstanding at a closed position, the panel locking device comprising:
    a locking lever supported to be rotatable about a spindle by a lever support portion provided at a first of the openable gate shaped panel and a cargo bed panel adjacent to the openable gate shaped panel;
    a movable hook rotatably coupled to an intermediate portion of the locking lever;
    a first fixed hook provided to a second of the openable gate shaped panel and a cargo bed panel and configured to engage with the movable hook when the openable gate shaped panel is located at the closed position, the first fixed hook defining a receiving U-shaped recess; and
    a pair of second fixed hooks provided to at an end of the lever support portion, spaced from each other to define a space between them, and configured to engage with the movable hook both at the closed position and an opened position of the openable gate shaped panel;
    wherein the movable hook extends outwardly in a vehicle width direction from the intermediate portion of the locking lever in the vehicle width direction so as to have a chevron shape projecting backwardly when viewed from above, and
    wherein each of the second fixed hooks has an inner recess in a U shape opened toward one side in the vehicle width direction, a front edge of the inner recess is slanted in the width direction, a rear edge of the inner recess is parallel to the vehicle width direction, and
    wherein, when the openable gate shaped panel is located at the closed position, the first fixed hook is received between the pair of second fixed hooks, the slanted front edges and the receiving U-shaped recess defining a guiding opening, extending in a direction away from the openable gate shaped panel, for receiving the movable hook;
    and when the movable hook is engaged with the pair of second fixed hooks, an axial center of the spindle is further from the openable gate shaped panel than an axial center of a proximal end of the movable hook.

2. The panel locking device for the vehicle cargo bed according to claim 1, wherein each of the second fixed hooks is provided integrally with the lever support portion.

3. The panel locking device for the vehicle cargo bed according to claim 1, wherein
    the lever support portion is provided to the openable gate-shaped panel.

4. The panel locking device for the vehicle cargo bed according to claim 3, wherein
    the openable gate-shaped panel is a tail panel at a rear end of the cargo bed, and
    the cargo bed panel adjacent to the openable gate-shaped panel is a side panel at one of left and right ends of the tail panel.

5. The panel locking device for the vehicle cargo bed according to claim 3, wherein
    the openable gate-shaped panel is a tail panel at a rear end of the cargo bed, and
    the cargo bed panel adjacent to the openable gate-shaped panel is one of two side panels at left and right ends of the tail panel, respectively.

* * * * *